April 2, 1957 F. ETZEL ET AL 2,787,662
AUTOMATIC TELEPHONE SYSTEM HAVING SWITCHING MEANS
FOR ROUTING CALLS IN DIFFERENT TRAFFIC DIRECTIONS
Filed Oct. 19, 1951
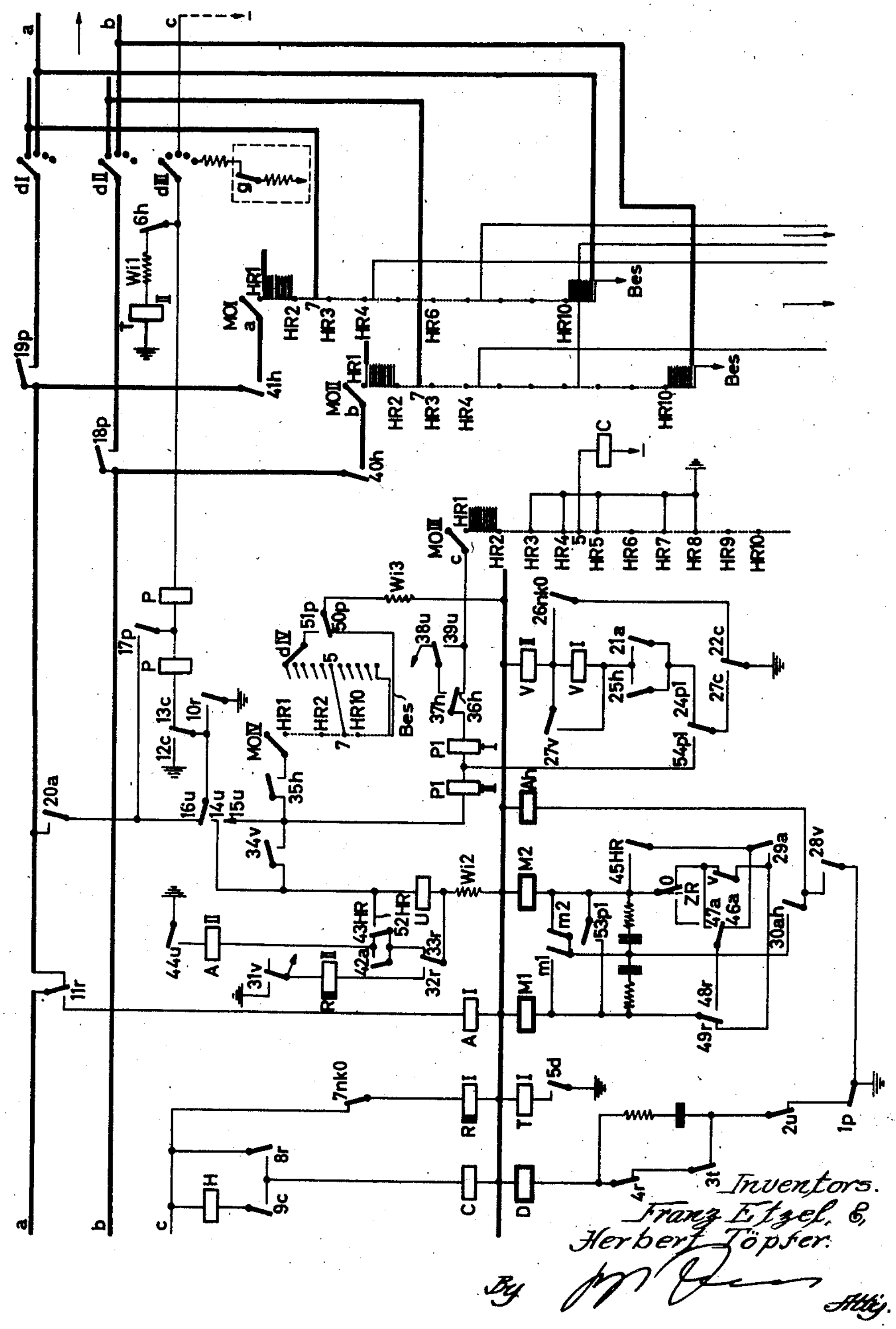
Inventors.
Franz Etzel &
Herbert Töpfer.
By
Atty.

United States Patent Office 2,787,662

Patented Apr. 2, 1957

2,787,662

AUTOMATIC TELEPHONE SYSTEM HAVING SWITCHING MEANS FOR ROUTING CALLS IN DIFFERENT TRAFFIC DIRECTIONS

Franz Etzel, Munich-Solln, and Herbert Töpfer, Munich, Germany, assignors to Siemens & Halske Aktiengesellschaft, Munich and Berlin, Germany, a German corporation Application October 19, 1951, Serial No. 252,019

Claims priority, application Germany October 25, 1950

17 Claims. (Cl. 179—18)

This invention relates to an automatic telephone system having switching means for routing calls in different traffic directions, and is particularly concerned with a system of this character in which calls in a predetermined traffic direction are set up over a rotary trunk selection switch provided with contacts made of ordinary metal and means for switching the line conductors of a call through over contacts made of precious metal.

A brief review of some antecedents is rendered below, so as to aid in appreciating the various features of the invention.

In order to avoid routing calls over circuitous paths and therewith unnecessary seizure of trunks and switching equipment, there are provided routing switches in systems involving main and subexchanges for routing calls in the various traffic directions, depending on certain marking digits dialed by calling parties. Associated with these routing switches are rotary switches which receive the corresponding marking digit to cause the setting of the routing switch in the desired traffic direction. Where there are numerous traffic directions in which calls have to be routed, one routing switch, with its associated rotary switch, is insufficient. An additional rotary switch must be provided for each traffic direction, thus causing considerable expenditure of equipment. However, if there are in a certain traffic direction numerous trunks, these rotary switches may be operated in the nature of preselecting switches which preselect an idle trunk before it is actually seized for establishing a call, thus placing their contacts in engagement with the corresponding trunk contacts without actually seizing the trunk. The advantage is that, after the routing switch is seized, there is no time lost in trunk-hunting, and the chances of wrong connections by misdirected dial impulses during the trunk-hunting are avoided.

One object of the invention is to use for the routing of the calls known rapidly operating switches having on the line wipers contacts of precious metal, so as to produce talking paths which are free of noises, without abandoning the advantage of the above-mentioned trunk preselection feature.

Difficulties appear, however, in substituting for the customary rotary preselector stepping switches, which are usually equipped with ordinary wiper contacts, rapidly operating switches, for example, motor-driven switches, which are generally provided with line wipers carrying contacts of precious metal, such wipers being, during the setting operations of the switch, lifted relative to the trunk contacts in the bank multiple. The reasons for these difficulties reside in the fact that the automatic progressive switching of a motor-driven switch cannot be accomplished incident to the preselection by the simple means available in the case of a rotary stepping switch.

A further object of the invention therefore is to carry out the trunk-hunting by means of a rotary stepping switch provided with wipers having contacts of ordinary metal, while the switching-through of the talking paths is carried out by a switch having contacts made of precious metal.

The switch having the precious metal contacts serves for the various traffic directions as a trunk selector and as a talking path selector. Its operation to effect the seizure of a trunk which had been preparatorily selected is caused by the switch having the ordinary contacts which operates as a trunk marker switch.

In accordance with another feature of the invention, the trunk-selecting switch takes care of the setting and of the switching-through of calls in other traffic directions, depending upon receipt of various digits. A single multi-group motor-driven switch having contacts of precious metal, as a trunk-selecting switch associated with a single preselector switch, having contacts of ordinary metal will then suffice for a large number of traffic directions.

The invention will now be explained with reference to the accompanying drawing.

Referring to the drawing, there is provided a rotary stepping switch having the stepping magnet D. The wipers of this switch are designated *d*I to *d*IV. The switch is normally in preselected, preparatory position with respect to the bank contacts of an idle trunk branching in a primary traffic direction. In addition, there is provided a motor driven switch having two field coils M1 and M2 which are in known manner displaced relative to one another by 90°. These field coils M1 and M2 are alternately energized under the control of cam contacts *m*1 and *m*2, thereby causing rotation of an armature which drives over a suitable gear the switch wipers MOI to MOIV. A motor driven switch of this kind is disclosed in copending application Serial No. 269,224, filed January 31, 1952, now Patent No. 2,701,824, dated February 8, 1955.

The routing switches, which may be disposed in an exchange, are seized over a group selector level. The trunks going in a primary traffic direction (in which the rotary switch is set in preparatory position) may extend to a main exchange, while the motor-driven switch gives access in other, secondary traffic directions, for example, subexchanges. Of the latter, the drawing shows, for the sake of simplicity, only two. The marking of the individual traffic directions is assumed to take place responsive to a single marking digit. When the marking digit designating the main exchange is dialled, subsequent to seizure of the switch shown in the drawing, the motor-driven switch will be operated to select the trunk to the main exchange, which has been preparatorily selected by the rotary switch, along a path which by-passes the switch wipers of the rotary preselecting switch. The talking path is then switched through over this by-pass. The initial operation of the motor driven switch takes place over a circuit including the wiper *d*IV of the rotary switch which, by suitable wiring, marks in the bank multiple thereof the preparatorily seized trunk. The motor-driven switch, which is set in response to the marking digit, is subsequently stopped, after reaching the marked trunk, by a circuit completed over its wiper MOIV.

In case a digit is dialled, which designates another traffic direction, the marking will be over another switch wiper MOIII and its associated bank contacts to cause merely a switching-through of the talking paths over the line wipers of the motor-driven switch. The previously mentioned switching-over is avoided.

More in detail, the operations are as follows:

The rotary switch is normally set with its wipers *d*I to *d*III (top right of drawing) in preparatory position in engagement with the bank contacts of an idle trunk branching in the primary traffic direction. This preparatory setting or preselection is accomplished by interplay of the magnet D (left center of drawing) of the rotary switch with the relay T. The rotary magnet D is energized in a circuit from ground, normal contacts 1*p*, 2*u*, 3*t*, 4*r*, magnet D to battery. Battery connection is designated in the drawing by the prominent horizontally extending line. The energization of the magnet D advances the wipers *d*I to *d*IV of the rotary switch by one step. At contact 5*d*, magnet D closes a circuit for the relay T which energizes and interrupts the circuit of magnet D at its contact 3*t*. Magnet D deenergizes and disconnects relay T by opening its contact 5*d*. Relay T restores, re-closing its contact 3*t* to cause re-energization of magnet D. This interplay continues until an idle trunk is found, in which case the relay T will remain energized over a circuit from ground, winding TII (right upper corner of drawing), resistor W*i*1, resting contact 6*a*, wiper *d*III and test or private conductor *c* to the test relay of the succeeding switch (not shown), and thence to battery. The test relay of the succeeding switch does not energize in this circuit, due to the high resistance of winding II of relay T in series with the resistor W*i*1. The sustained energization of relay T keeps contact 3*t* open thereby preventing re-operation of the magnet D, and the rotary switch is thus stopped with its wipers *d*I to *d*III in engagement with the bank contacts of an idle trunk.

It will first be assumed that a digit is received which designates the primary traffic direction. When the circuit shown in the figure is seized by the preceding group selector, relay R will be energized over its winding I (left center of drawing), over a path from ground at the preceding group selector, private conductor *c* (left upper corner of drawing), resisting contact 7*nko* (which is a cam-operated, off-normal contact of the motor switch), winding I of relay R, to battery. Upon energizing, relay R closes its contacts 10*r* (top center of drawing), connecting the test relay P in parallel with the winding II of relay T; that is, relay P is connected to the test conductor *c* of the preselected trunk. Relay P energizes in the test circuit to the succeeding switch and short-circuits its high-resistance winding over contacts 17*p*, 16*u*, 10*r*. The preselected trunk is now busied. The connection of the test relay P in parallel with winding II of relay T, as described, causes a voltage drop at the winding II of relay T, and the latter restores to normal. The drive magnet D of the rotary switch cannot reoperate in its previously described energizing circuit, because relay P has operated and has opened its contact 1*p*. The energization of relay R places relay C over contacts 8*r* in parallel with the winding I of relay R, thus connecting C to the incoming private conductor *c* and causing it to energize. Over its contacts 11*r*, relay R connects the winding I of the impulse or line relay A to the incoming line conductor *a*, thus preparing the impulse relay for receiving the impulse series which corresponds to the marking digit. Relay R, at its contact 4*r*, opens another point in the circuit of the drive magnet D of the rotary preselector switch. At its contacts 18*p* and 19*p*, relay P connects the line conductors *a*—*b* through in the principal traffic direction.

Impulse relay A is successively energized by the incoming impulse series, and re-transmits such impulses over the line conductor *a* to the succeeding switch from ground, closed contacts 12*c*, resting contacts 16*u*, impulse contact 20*a*, closed contacts 19*p*, wiper *d*I and outgoing trunk conductor *a*. Relay V, upon energization of the impulse relay A responsive to the first impulse, is energized in the following circuit: ground, contact 22*c* in closed position 27*c*, 24*p*1, 21*a*, windings I, II of relay V, to battery. Relay V energizes, short-circuits its winding I by closing its contact 27*v*, and remains operated for the duration of the impulse series. Relay V closes an energizing circuit for the magnet A*h* from ground at contact 1*p* (left lower corner of drawing), over contact 28*v*, winding of magnet A*h*, to battery. Magnet A*h*, as one of its functions, lifts the line wipers MOI and MOII relative to their bank contacts, for the duration of the selecting operations, and initiates the operation of the motor-driven switch by closing a circuit from ground, 28*v*, 30*ah*, *m*2, to the winding of the field coil M2. This field coil alone is now energized and attracts the armature of the motor, thus initiating the rotation of the switch. Responsive to rotation of the motor shaft, the cam contacts *m*1 and *m*2 are controlled in such a manner that contact *m*2 opens incident to the energization of the field coil M2 while contact *m*1 is closed, and vice versa, the cam contact *m*1 is opened upon energization of the field coil M1 while the contact *m*1 is closed. The motor-driven switch is stopped at a time when both field coils M1 and M2 are simultaneously energized.

The motor-driven switch operates in this manner, under its own control, rapidly rotating its wipers over one group of bank contacts representing one decade. The off-normal contacts 7*nko* and 26*nko* are operated into their alternate positions when the motor-driven switch leaves its normal position. The winding I of relay R is accordingly disconnected upon opening of the off-normal contact 7*nko*, but relay R is held energized over its winding II in a circuit from ground, 31*v*, winding RII, 32*r*, resistor W*i*2, to battery. The motor-driven switch is stopped after sweeping over the bank contacts of one decade, by the actuation of a cam-operated switch contact 45HR (relay A having at this moment deenergized after receiving its first impulse) which connects in an energizing circuit both field coils M1 and M2 in circuits from ground, 28*v*, 30*ah*, M2, for the field coil M2, and ground, 28*v*, 30*ah*, *m*2, 45HR, 46*a*, 48*r*, for the field coil M1, respectively.

Responsive to the second current impulse of the dialled marker digit, the impulse relay A will again energize and will open the circuit for the field coil M1 at its contact 46*a*. The operation of the motor-driven switch is therefore resumed by the alternate actuation of its field coils M1 and M2 under the control of the cam contacts *m*1 and *m*2, and the switch rotates its wipers with respect to the bank contacts of the next decade. This interplay continues until the switch reaches the decade which has been designated by the dialled marker digit.

If it is assumed that this digit is, in the case of the main exchange, for example, the digit 2, the switch will be positioned, after receiving the corresponding impulse series, with respect to the second decade, with its wiper MIII in front of the second decade positioned upon the decade contact HR2. There is no potential on this contact to be picked up by the wiper MIII. After conclusion of the impulse series, relays A, V, R will successively deenergize. Relay R at contact 8*r* opens the shunt around relay H, and the latter energizes in series with the test relay C over the incoming private or test conductor *c*. Upon energizing, relay H closes at its contact 25*h* a circuit for the re-operation of relay V, from ground, 27*c*, 24*p*1, 25*h*, windings I and II of relay V, in series, to battery. Relay V connects the wiper-lifting magnet A*h* over its contact 28*v*. The field coils M1 and M2 are again energized as before, over the circuit including the contacts 28*v* and 30*ah*. The motor-driven switch operates in a hunting operation with respect to the individual contacts in the selected decade. Its wiper MII finds in position 7 the trunk selected by the preselector switch, whose wiper *d*IV is in position 5, closing a circuit for the relay P1, from ground, 31*v*, 38*u*, 37*h*, windings I, II of relay P1, 35*h*, motor switch wiper MOIV in position 7 of decade 2, position 5 of wiper *d*IV of the rotary switch, 51*p*, and resistor W*l*3, to battery. The relay P1 energizes and stops the motor switch by actuating its contact 53*p*1, causing simultaneous energization of both field coils M1 and M2. This condition persists until relay V is deenergized. The high-resistance winding II of the relay P1 is shunted over contact 54*p*1, and the seized trunk line is blocked against seizure from other switches.

The talking path from the preceding to the next succeeding switch is now established over the contacts **40*h* and 41*h*** in parallel with the wipers *d*I and *d*II of the preselecting switch, by way of the motor-driven switch wipers MOI and MOII which are equipped with contact points of precious metal.

The release of the connection is accomplished by interruption of the circuit over the test or private conductor *c* at the preceding group selector. The release of the relays C and H follows. After release of relay C, relay V is again energized over the closed off-normal contact **26*nko***. Relay V again energizes the wiper-lifting magnet A*h*, thereby again causing the motor switch to operate in the manner as already described, until it reaches its normal position when the relay V is deenergized by the opening of the off-normal contact **26*nko***.

If a digit is received which marks another, secondary traffic direction for example, the digit 4 for the direction 1 (indicated at the right lower corner of the drawing), the line or impulse relay A will successively energize four times. Relay V will energize at the first current impulse and will switch in the wiper-lifting magnet A*h*. The motor-driven switch will rotate as described until it is stopped in its intermediate decade stop position HR4 in front of the fourth decade, which has been designated by the dialled digit. Upon conclusion of the impulse series, relay V restores with some delay, followed by delayed deenergization of relay R, after which relay H energizes in series with the relay C, as already described. At the intermediate decade stop position HR4 there is ground connected to the corresponding multiple of the motor switch and, when the switch reaches this intermediate decade stop position, relay U will energize, from ground, HR4, wiper MIII, **36*h*, windings I, II of relay P1, 34*v***, winding of relay U, and resistor W*i*2, to battery. Relay P1 does not energize in this circuit, due to the high resistance of relay U. The latter is held in a holding circuit independently of relay V which extends from ground, **12*c*, 14*u***, winding of relay U, resistor W*i*2, to battery. The test relay P deenergizes responsive to opening of contact **16*u*. Relay V is connected again responsive to energization of relay H over contact 25*h*** and switches in the wiper lift magnet A*h*. The motor switch now operates to hunt for an idle trunk line in the fourth decade or trunk group. Upon finding an idle trunk, relay P1 is energized, from ground, **12*c*, 14*u*, 15*u*, windings II and I of P1, 37*h*, 39*u*, wiper MOIII, position 5 in decade 4**, test relay C in the succeeding switch, to battery.

Relay P1 stops the motor switch by closing its contact **53*p*1. The seized trunk line is busied against seizure from other switches, by the actuation of contact 54*p*1. Relay V deenergizes with some delay, responsive to the opening of contact 24*p*1**. The motor-driven switch is stopped by the deenergization of relay V in a manner described before.

The connection is now switched through in the subsidiary traffic direction, over the contacts **40*h*, 41*h***, and the switch wipers MOI and MOII.

In case there is no idle trunk line available in the secondary traffic direction 1, the motor switch will rotate through to the next trunk group or decade. It is stopped at the next intermediate decade stop position, because relay A is energized during the trunk-hunting operation in a circuit from ground, **44*u*, winding II of relay A, 43HR, 33*r***, resistor W*i*2, to battery. The two field coils M1 and M2 are simultaneously connected, namely, field coil M2 from ground, **28*v*, 30*ah***, *m*2, winding of field coil M2, to battery, and field coil M1 from ground, **28*v*, 30*ah***, contact *m*2, 45RH, **29*a*, 49*r*, winding of coil M1, to battery, thereby stopping the switch. As already described, the relay R has deenergized after the impulse series. After the intermediate decade stop position is reached, relay U is shunted over contact 52HR, and deenergizes, thereby causing deenergization of relay A by disconnecting its winding II at 44*u***. The motor switch again starts to rotate after energization of the relays H, V and A*h*, and rotates its wipers through to the busy position "B*es*" at the end of the last (tenth) decade. Relay P1 now energizes from ground, **31*v*, 38*u*, 37*h*, windings I and II of P1, 35*h***, wiper COIV, conductor "B*es*," **50*p***, resistor W*i*3, to battery. The relay P1 stops the motor switch as already described, by closing its contacts **53*p*1 to cause simultaneous energization of the field magnets M1 and M2, and disconnects relay V at contact 24*p*1, which in turn disconnects relay P1 contact 31*v***.

In case no idle trunk is available in the primary traffic direction at the time of seizure of the switch, relay P can not energize. The receipt of the digit which designates the primary traffic direction causes the switch to operate. Since the relay P is deenergized, the switch will continue to rotate its wipers to the busy position, and busy signal is transmitted to the calling party.

If the individual traffic directions require two digits, the motor driven switch is suitably provided with a circuit, causing an overrunning of its zero position in response to the product of the impulse series exceeding ten impulses. The switch is then automatically reset to the decade which exceeds the figure ten.

Of there is only one switching routing direction and a great number of trunk lines in the primary traffic direction, the invention may of course be practiced in such a manner that the motor driven switch is caused to hunt in the primary direction, while the rotary switch, with the contacts of ordinary metal, acts as a preselector for trunks in the secondary traffic direction. The motor-driven switch is then set to complete the talking path by bridging the ordinary contacts of the rotary switch by its switch arms or wipers carrying the contacts of precious metal.

Changes may be made within the scope and spirit of the appended claims.

What is claimed is:

1. In an automatic telephone system, a motor-operated selector switch having a trunk line multiple giving access to trunk lines in a plurality of different traffic directions, said switch having line wipers carrying contacts made of precious metal, a rotary step-by-step switch cooperating with said motor-operated switch having line wipers carrying contacts of ordinary metal, said rotary step-by-step switch having access only to trunk lines branching in a predetermined traffic direction, means for causing said rotary step-by-step switch to preselect an idle trunk line in said predetermined traffic direction to keep such preselected trunk line in readiness without actually seizing it, a marker multiple, a marker wiper operated by said rotary step-by-step switch for marking in said marker multiple the trunk line preselected by it, means for seizing said motor-operated switch and for directing thereto series of impulses which designate desired traffic directions in which calls are to be extended, a marker wiper for said motor-operated switch for coaction with the contacts of said marker multiple, means responsive to seizure of said motor-operated switch for seizing the trunk line branching in said predetermined traffic direction which had been preselected by said step-by-step switch, circuit means responsive to marker impulses delivered to said motor-operated switch which designates said predetermined traffic direction for moving its marker wiper relative to said marker bank multiple to establish a test circuit over the marker wiper of said rotary step-by-step switch, means controlled by said test circuit for stopping said motor-operated switch, the line wipers of said motor-operated switch carrying the contacts made of precious metal being connected in a by-pass circuit extending in parallel to the line wipers of said rotary step-by-step switch, and relay means thereafter effective to extend the line conductors of said switch over said by-pass circuit.

2. The structure defined in claim 1, comprising a marker multiple including contacts and designating trunk lines branching in traffic directions other than said predetermined traffic direction, and an additional marker wiper for said motor-operated switch for coaction with said last-named marker multiple to cause said motor-operated switch to hunt for idle trunks in the corresponding traffic directions depending upon marker digit impulses delivered thereto.

3. The structure defined in claim 1, comprising a marker multiple including contacts and designating trunk lines branching in traffic directions other than said predetermined traffic direction, an additional marker wiper for said motor-operated switch for coaction with said last-named marker multiple to cause said motor-operated switch to hunt for idle trunks in the corresponding traffic directions depending upon marker digit impulses delivered thereto, contacts in a line bank multiple designating a busy position of said motor-operated switch, and circuit means for causing said motor-operated switch to move its wipers to said busy position if no idle trunk is found in any traffic direction.

4. In a automatic telephone system having groups of trunk lines extending in different traffic directions including primary and secondary traffic directions, a first switch comprising wipers including line wipers carrying contact points made of ordinary metal for engagement with associated bank contacts connected with conductors of trunk lines extending in a primary traffic direction, circuit means for automatically actuating said first switch to preselect an idle trunk line extending in said primary traffic direction by engagement of its wipers with bank contacts connected with conductors corresponding to such idle trunk line, a second switch comprising wipers including line wipers carrying contact points made of precious metal for engagement with associated bank contacts connected with conductors of trunk lines extending respectively in said primary and in said secondary traffic directions, circuit means for transmitting to said second switch dial pulses indicating a desired traffic direction in which a call is to be extended, a by-pass circuit for the line wipers of said first switch, control means responsive to dial pulses indicating a call to be extended in said primary traffic direction for actuating said second switch to set its line wipers carrying said precious metal contact points over said by-pass circuit in engagement with the line conductors of said preselected idle trunk extending in said primary traffic direction, and further control means responsive to dial pulses indicating a call to be extended in a secondary traffic direction for extending such call directly over the line wipers of said second switch in engagement with bank contacts connected with line conductors of a corresponding idle trunk line.

5. The system and cooperation of parts as set forth in claim 4 comprising marker means controlled by said first switch for controlling the setting of the wipers of said second switch with the line wipers thereof relative to said by-pass circuit.

6. The system and cooperation of parts as set forth in claim 5, wherein said marker means comprises a bank of control contacts for said first switch and a bank of control contacts for said second switch, a control wiper for each bank of control contacts governed by the corresponding switch, and conductors interconnecting predetermined contacts in said banks.

7. The system and cooperation of parts as set forth in claim 5, comprising means in said second switch for maintaining the line wipers thereof out of engagement with associated bank contacts during the setting operation of such switch.

8. The system and cooperation of parts as set forth in claim 5, wherein said second switch is a motor-driven rotary switch comprising a pair of alternately operable field magnets for effecting the rotation of its wipers relative to associated bank contacts, and means for maintaining the line wipers of said second switch out of engagement with associated bank contacts during the setting operation of such switch.

9. The system and cooperation of parts as set forth in claim 8, comprising group contacts included in the bank contacts of said second switch which designate the respective groups of trunk lines accessible to the wipers thereof in accordance with dial impulse series respectively designating such groups.

10. The system and cooperation of parts as set forth in claim 9, comprising circuit means for connecting a predetermined marking potential to the respective group contacts of the groups of trunk lines extending in secondary traffic directions.

11. A system and cooperation of parts according to claim 8, comprising group bank contacts included in the bank contacts of said second switch, said group bank contacts designating decade groups of trunk lines branching therefrom in different traffic directions, means in said second switch for receiving impulses corresponding to a dialed digit directed thereto which designates a decade group, means in said second switch responsive to said impulses for selecting a trunk in said decade group, each decade group being separated by intermediate stop positions, and circuit means for marking said intermediate stop positions.

12. A system and cooperation of parts according to claim 8, wherein said second switch has access to groups of trunk lines extending in different traffic directions through a bank multiple comprising contacts arranged according to different decades, means in said second switch for receiving impulses corresponding to a dialed digit directed thereto and designating a decade for causing said second switch to move its wipers correspondingly, and means for thereafter causing said switch to hunt for an idle trunk in the decade designated by said impulses directed thereto.

13. A system and cooperation of parts according to claim 8, wherein said second switch has access to groups of trunk lines extending in different traffic directions through a bank multiple comprising contacts arranged according to different decades, means in said second switch for receiving impulses corresponding to a dialed digit directed thereto and designating a decade for causing the switch to move its wipers correspondingly, means for thereafter causing said switch to hunt for an idle trunk in the decade designated by said impulses directed thereto, and a single control relay for governing the setting operations of said second switch in all traffic directions.

14. A system and cooperation of parts according to claim 8, wherein said second switch has access to groups of trunk lines extending in different traffic directions through a bank multiple comprising contacts arranged according to different decades, means in said second switch for receiving impulses corresponding to a dialed digit directed thereto and designating a decade for causing the switch to move its wipers correspondingly, means for thereafter causing said second switch to hunt for an idle trunk in the decade designated by said impulses directed thereto, a single control relay for governing the switching operations of said second switch in all traffic directions, and means governed by said control relay for connecting a test potential for the testing of idle trunks in any designated traffic direction.

15. A system and cooperation of parts according to claim 8, wherein said second switch is a motor-driven switch having access to a bank multiple including contacts respectively associated with trunk lines branching therefrom in said secondary traffic directions, said contacts being disposed in groups, marker contacts between said groups marking intermediate stop positions for said switch, means in said second switch for receiving impulses corresponding to a dialed digit directed thereto and designating a desired group, means responsive to said impulses for marking a predetermined marker contact, means for setting a wiper of said switch relative to said marked contact, relay means effective subsequent to setting of the wipers of said second switch for preparing said switch to stop if all trunk lines in the designated traffic direction are busy, and circuit means for stopping said switch responsive to reaching its successive intermediate stop position.

16. A system and cooperation of parts according to claim 8, wherein said second switch is a motor-operated switch having access to a trunk multiple including bank contacts respectively associated with trunk lines branching therefrom in said secondary traffic directions, said bank contacts being disposed in groups, marker contacts between said groups marking intermediate stop positions for said switch, means in said second switch for receiving impulses corresponding to a dialed digit directed thereto and designating a desired group for marking a predetermined marker contact, means for setting a wiper of said switch relative to said marked contact, relay means effective subsequent to setting of the wipers of said second switch for preparing said second switch to stop if all trunk lines in the designated traffic direction are busy, circuit means for stopping said switch responsive to reaching its successive intermediate stop position, means designating a busy position for said switch, and means for preparing a test circuit for said switch in the busy position thereof.

17. A system and cooperation of parts according to claim 8, comprising bank contact means for said second switch to give access to trunk lines branching in said secondary traffic directions, means in said switch for receiving impulses corresponding to a dialed digit directed thereto and designating a secondary traffic direction for causing said switch to hunt for an idle trunk line in the corresponding traffic direction, and circuit means effective if no idle trunk line is found for causing said first switch to move its wipers to a busy position in which a busy signal is transmitted to the calling line.

References Cited in the file of this patent

UNITED STATES PATENTS

| | | |
|---|---|---|
| 1,617,869 | Slough | Feb. 15, 1927 |
| 1,645,972 | Rousseau | Oct. 18, 1927 |
| 2,106,897 | Mercer | Feb. 1, 1938 |